US012766682B2

(12) United States Patent
Rose

(10) Patent No.: US 12,766,682 B2
(45) Date of Patent: Oct. 20, 2026

(54) TOOL AND METHOD FOR REMOVING HELICAL INSERT TANG

(71) Applicant: PRATT & WHITNEY CANADA CORP., Longueuil (CA)

(72) Inventor: James Rose, Georgetown (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/037,885

(22) Filed: Jan. 27, 2025

(65) Prior Publication Data

US 2026/0216851 A1 Jul. 30, 2026

(51) Int. Cl.
*B25B 27/14* (2006.01)
*F01D 25/00* (2006.01)

(52) U.S. Cl.
CPC ............ *B25B 27/143* (2013.01); *F01D 25/00* (2013.01); *F05D 2220/32* (2013.01); *F05D 2230/68* (2013.01)

(58) Field of Classification Search
CPC .. B25B 27/143; B25J 1/02–04; A61B 17/221; A61B 2017/320073; A61B 2017/2212
See application file for complete search history.

(56) References Cited

U.S. PATENT DOCUMENTS 1,816,723 A * 7/1931 Dunoyer ................. B25B 1/205 269/285
2,594,901 A * 4/1952 Forster .................. B25B 27/143 81/463
2,947,564 A * 8/1960 Winther ...................... B25J 1/04 294/100
3,152,495 A * 10/1964 Neuschotz ............ B25B 27/143 81/53.2
4,575,143 A * 3/1986 Nast ........................... B25J 1/04 294/24
4,980,959 A * 1/1991 Czarnowski .......... B25B 27/143 29/240.5
5,172,842 A * 12/1992 Viscio .................. B23D 31/002 225/93
5,906,622 A * 5/1999 Lippitt ...................... B25B 9/00 606/127
6,421,896 B1 * 7/2002 Beyer ..................... B25B 27/24 81/3.43

(Continued)

FOREIGN PATENT DOCUMENTS

AU 2008100681 A4 * 8/2008
DE 102016125481 A1 6/2018

(Continued)

*Primary Examiner* — Jacob J Cigna
(74) *Attorney, Agent, or Firm* — Norton rose fulbright Canada LLP

(57) ABSTRACT

The tool can be used for manipulating a tang of a helical insert during installation. The tool can have a guide member having a working tip, and a holder. The tool can have a stem member slidingly engaged with the guide member, the stem member having a tang catch adjacent the first end, and an actuator protruding from the second end; and a biasing member coupled between the guide member and the stem member, the biasing member biasing the stem member to a rest position relative the guide member, in which rest position the tang catch is retracted into the working tip.

6 Claims, 4 Drawing Sheets

(56) References Cited

U.S. PATENT DOCUMENTS

| | | | |
|---|---|---|---|
| 6,644,149 | B2 | 11/2003 | Giannakakos et al. |
| 6,860,173 | B2 * | 3/2005 | Newton ................ B23P 19/065 29/240.5 |
| 7,340,814 | B2 | 3/2008 | Bruehwiler et al. |
| 8,104,806 | B1 * | 1/2012 | Shih ........................... B25J 1/02 294/120 |
| 11,059,152 | B2 | 7/2021 | Faria |
| 11,103,964 | B2 * | 8/2021 | Lipkin .................... F01D 5/005 |
| 11,383,335 | B2 * | 7/2022 | Bullock ................ B25B 27/143 |
| 11,400,571 | B2 * | 8/2022 | Goto ..................... B25B 27/143 |
| 11,583,996 | B2 * | 2/2023 | Skertich .................... A61F 4/00 |
| 2003/0102348 | A1 | 6/2003 | Andersson et al. |

FOREIGN PATENT DOCUMENTS

| | | | | | |
|---|---|---|---|---|---|
| EP | 0318726 | A2 | * | 6/1989 | ........... B23D 29/002 |
| EP | 3131703 | B1 | | 11/2019 | |
| GB | 1192336 | A | * | 5/1970 | ........... B25B 27/143 |
| JP | 2001150363 | A | * | 6/2001 | ........... B25B 27/143 |
| KR | 20010085936 | A | * | 9/2001 | |

* cited by examiner

TOOL AND METHOD FOR REMOVING HELICAL INSERT TANG

TECHNICAL FIELD

The application relates generally to gas turbine engines and, more particularly, to a tool and method for breaking and removing a driving tang of a helical insert after its installation in a gas turbine engine.

BACKGROUND OF THE ART

During a typically installation procedure, helical inserts (sometimes referred to as helical coils, or a "helicoil") are driven into a mating aperture using a tool which is engaged into the cylindrical cavity within the helical coil, with the tip of the tool engaged with the driver tang, and the driver tang is used to transfer torque from the tool to the coiled portion. After installation, it can be required to break off and remove the driver tang.

In some applications helical inserts are used in through apertures of gas turbine engine components which can communicate with the gas path. In such cases, for instance, the step of breaking and removing the driver tang can become delicate, especially when one wishes to effectively break and remove the driver tang while mitigating the risk of dropping the driver tang into the gas path. There remains room for improvement.

SUMMARY

In one aspect, there is provided a tool comprising: a guide member having a working tip at a first end, and a holder at a second end, opposite the first end; a stem member slidingly engaged with the guide member, the stem member having a tang catch adjacent the first end, and an actuator protruding from the second end; and a biasing member coupled between the guide member and the stem member, the biasing member biasing the stem member to a rest position relative the guide member, in which rest position the tang catch is retracted into the first end.

In one aspect, there is provided a tool for manipulating a tang of a helical insert during installation of the helical insert, the tool comprising: a guide member having a working tip at a first end, and a holder at a second end; a stem member slidingly engaged with the guide member, the stem member having a tang catch adjacent the first end, and an actuator protruding from the second end; and a biasing member coupled between the guide member and the stem member, the biasing member biasing the stem member to a rest position relative the guide member, in which rest position the tang catch is retracted into the first end; wherein a user can apply an external force to the stem member via the actuator and holder, against the bias of the biasing member, to push the tang catch out from the guide member from where the tang catch can be engaged with the tang.

In another aspect, there is provided a method of installing a helical insert in an aperture communicating with a gas path of a gas turbine engine, the helical insert having a tang, the method comprising: sliding a stem member of a tool relative a guide member of the tool, thereby exposing a tang catch of the stem member, including applying an external force against a bias force; moving the tang catch across a cylindrical cavity of the helical insert, towards the tang; while the tang catch is exposed, engaging the tang catch with the tang; while the tang is engaged with the tang catch, releasing the external force, the bias force thereby retracting the stem member in the guide member and engaging the tang against a working tip of the guide member; rotating the helical insert in the aperture, thereby threadingly engaging a body of the helical insert with the aperture, including rotating the tool around a length of the tool, while the tang is engaged against the working tip by the bias force.

In a further aspect, there is provided a method of removing a tang of a helical insert installed in an aperture, the method comprising: i) bending the tang back and forth relative the body of the helical insert using the tool, ii) breaking the tang off from the body of the helical insert, and iii) removing the tang from the aperture using a tool, while the tang is engaged with a tang catch of a stem member of the tool, and pushed against a working tip of a guide member of the tool by the tang catch under the action of a bias force exerted passively by a biasing member between the guide member and the stem member.

As used herein, the singular forms "a," "an," and "the" are intended to include the plural forms as well, unless the context clearly indicates otherwise.

DESCRIPTION OF THE DRAWINGS

Reference is now made to the accompanying figures in which.

DETAILED DESCRIPTION

Figure 1:
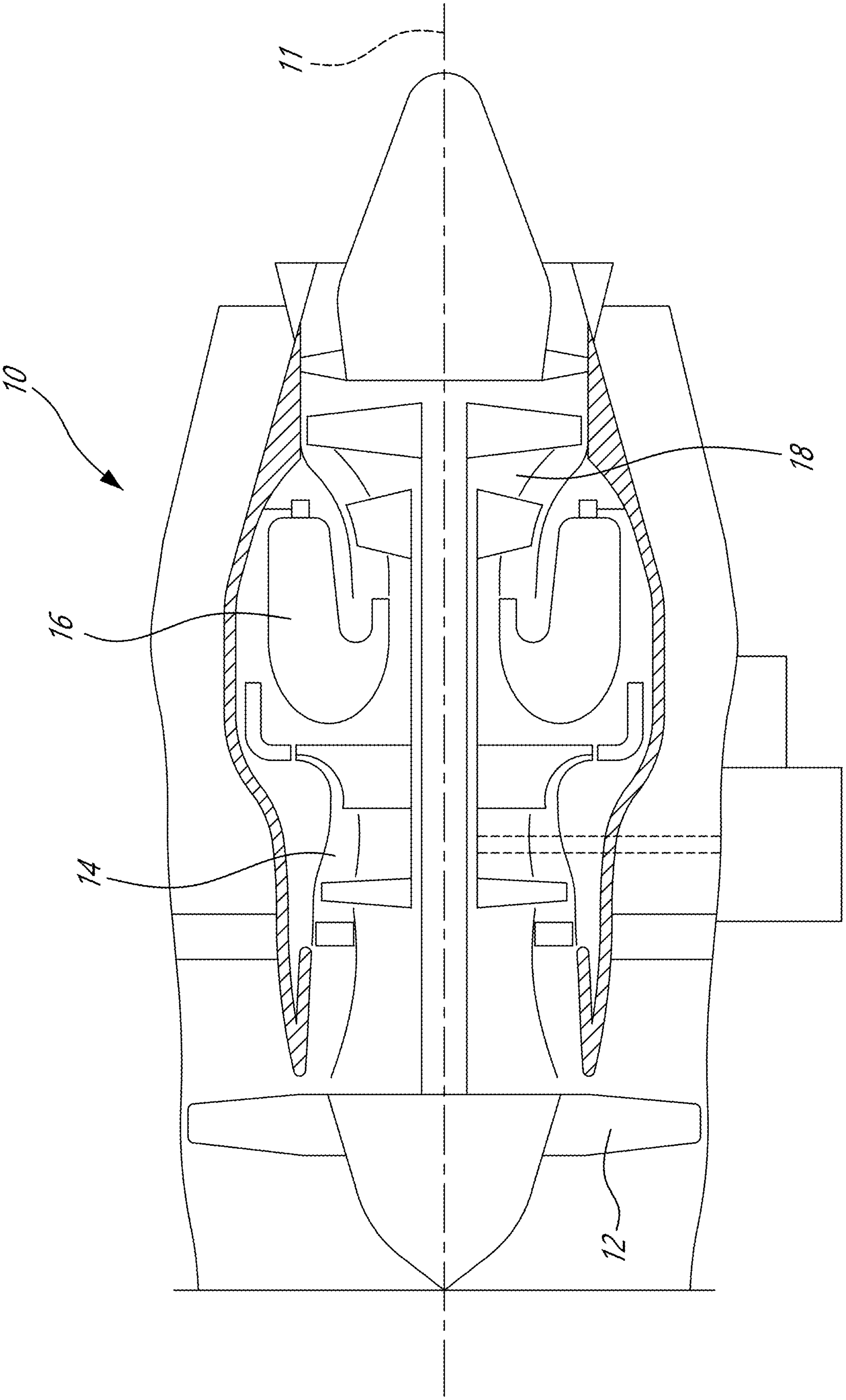
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Threaded inserts, also known as threaded bushings, are fastener elements which are designed to be introduced into an object to add a thread. Some threaded inserts have a helical shape and are configured to be introduced into a bore having a female thread. Such helical threaded inserts can be referred to as helical inserts, screw thread inserts, helical coils. Common examples of helical inserts are manufactured under the registered trademark Heli-Coil. They can be used to repair a stripped thread, provide a more durable thread into a softer material, place a thread on a material too thin to be threaded into, etc. They can be used to provide additional repairability, preventing stripping of a tapped hole in the part or acting as a protecting barrier for the threads as it can be easier to replace an insert instead of an entire part.

They can also be used to create better bolt retention and even add some locking effect to the bolts to help with preventing bolts from self-loosening.

Figure 2:
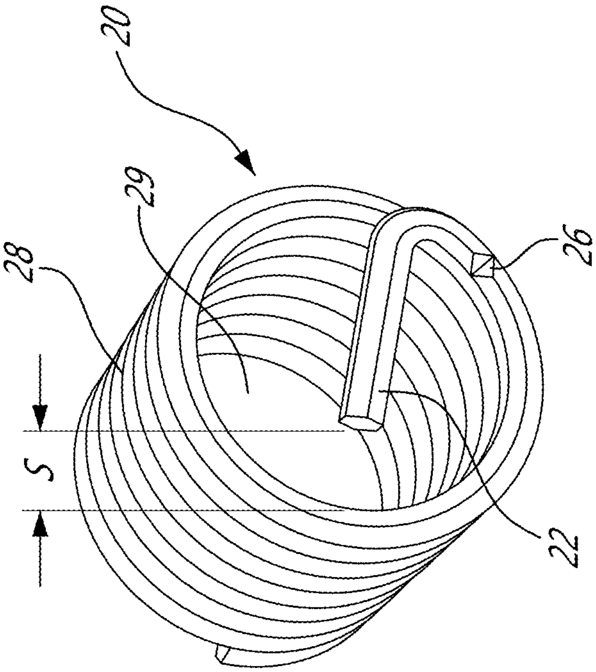
FIG. 2 is an oblique view of a helical insert having a tang.
Figure 4:
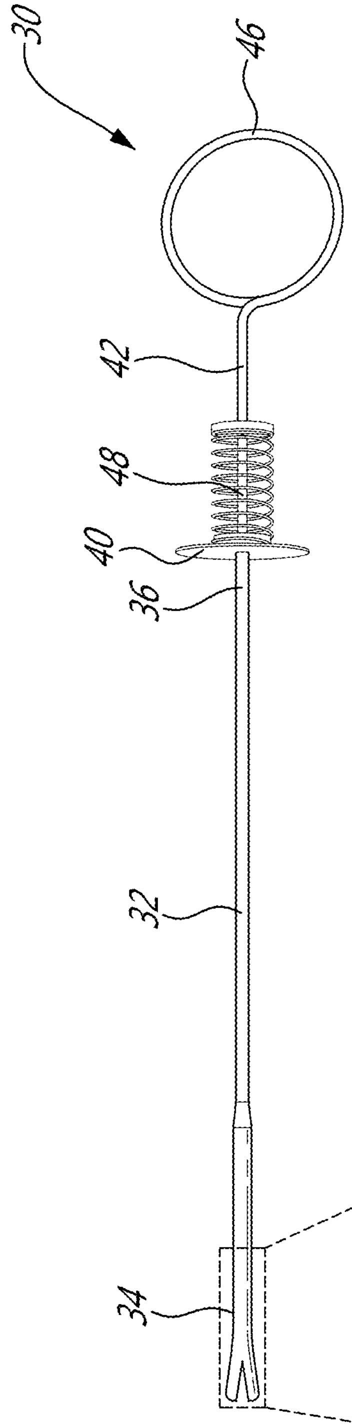
FIG. 4 is a side view of a tool for manipulating the tang.

An example of a helical insert 20 is presented in FIG. 2. The helical insert 20 can be seen to have a body 28 made of coiled wire arranged in a tight helical shape, leaving a central cavity 29. In this case, a wire made of a hard metal and having a square cross-section is used, but other embodiments are possible. The helical arrangement of the coiled wire is terminated in a radially-oriented tip referred to as a driver tang, or simply "tang" 22, which protrudes from the periphery toward the axis of the helical shape. There is provided a gap S between the tip of the tang 22 and the closest coil portion.

Figure 3:
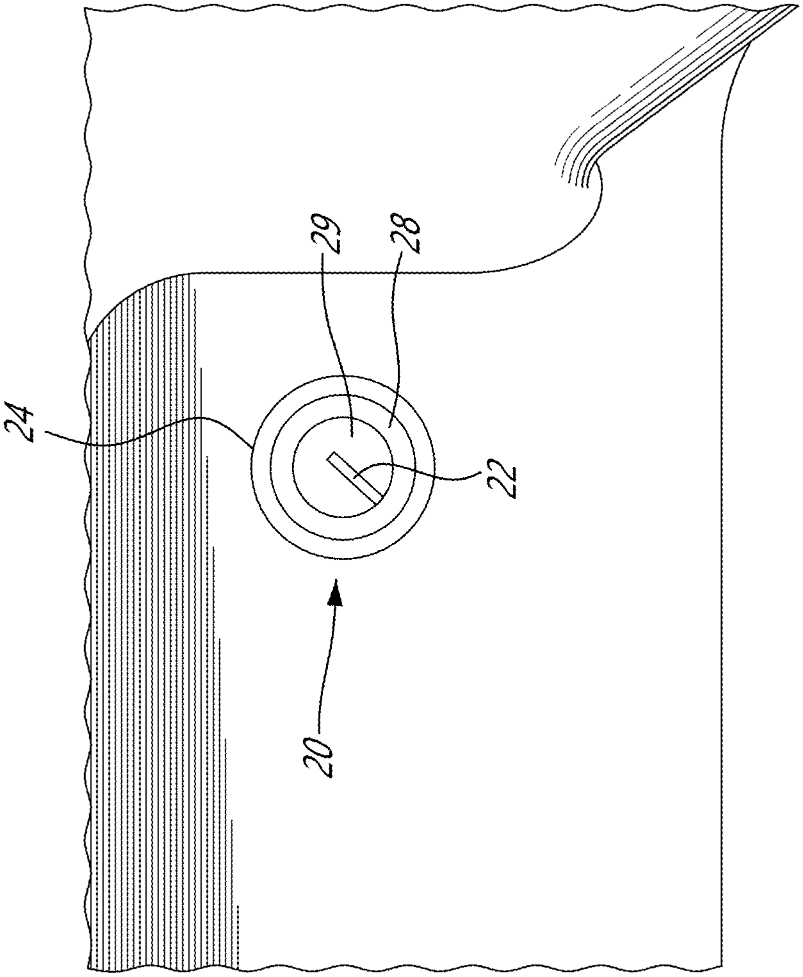
FIG. 3 is a front elevation view of the helical insert engaged with an aperture in a gas turbine engine, with the tang still in place.

The helical insert 20 can be assembled into an aperture 24, such as a tapped hole, of a component in a gas turbine engine 10 with the tang 22 being the deepest portion of the helical insert 20 relative to the mouth of the aperture 24, such as the arrangement shown in FIG. 3. This can be performed, by using a tool which reaches lengthwisely across the cavity 29 along an axis of the helical geometry and engages the tang 22, via which it can transfer torque to the helical portion and overcome friction between the helical portion and the aperture 24. After installation, it can be required to break off and remove the tang 22. Some helical inserts 20 have a notch 26 (see FIG. 2) formed between the body 28 and the tang 22 which creates a designed weakness forming a preferential point of rupture specifically for this function. Breaking the tang 22 may involve bending the tang 22 back and forth in the vicinity of the notch 26 until fatigue in the metal results in rupture. In some applications, such as when the aperture 24 is a through aperture, and especially if it communicates with the gas path for instance, it can be desirable to mitigate the risk of dropping the tang 22 into the aperture 24 during removal.

Accordingly, while a tool such as long nose pliers may be used to hold the tang 22 during the operation of engaging the helical insert 20 in the tapped hole and/or breaking the tang 22 off from the main body 28 once the helical insert 20 is in place, such pliers rely on constant pressure applied on the handles to maintain the tang 22 firmly held, which may be imperfectly reliable throughout operations such as bending the tang back and forth. Relaxing of the pressure may result in relaxing the grip on the tang 22, and ultimately in dropping the tang 22 in the aperture 24 where it may form a foreign object debris (FOD) hazard.

U.S. Pat. No. 11,059,152 presents an example of a tool which can be used instead of long nose pliers for such an operation. This tool can rely on pressure applied by a mechanism having a threaded member used to hold the tang in the tool, and may also be narrower than long nose pliers. On the other hand, the amount of pressure imparted by the tool depended on the tightness of activation of the mechanism, and the maintenance of the position the tang in the tool throughout the operation. Moreover, in a mindset of ensuring that sufficient pressure was applied, the user may drive the mechanism to apply too much pressure, which may lead to breaking of the tool and loss of the tang.

It was found that using elastic bias energy, such as can be imparted by a spring, could be a more reliable way of holding the tang 22 in a tool than in the examples presented above, at least in some embodiments.

An example of a tool 30 which can help in effectively removing the tang 22 while mitigating the risk of dropping the tang 22 is presented in FIGS. 4 and 5A to 5D. The tool 30 has a guide member 32 having a tubular shape and having two opposite ends 34, 36. A first end 34 has a working tip 38 whereas the second end 36, distal from first end 34, has a guard, trigger, or holder 40. A stem member 42 is slidingly engaged with the guide member 32. In this example, the stem member 42 is also elongated with two opposite ends including a first end which has a tang catch 44, and a second end having an actuator 46. The stem member 42 can be lengthwisely slid back and forth in the guide member 32 by moving the actuator 46 while holding the holder 40, for instance. In this example embodiment, the actuator 46 is simply embodied as a thumb hole whereas the holder 40 is configured to be held by fingers of a user while the thumb of the user is in the thumb hole. The movement of the stem member 42 in the guide member 32 can result in selectively extending the tang catch 44 out from the working tip 38 of the guide member 32, and retracting the tang catch 44 back into the working tip 38 of the guide member 32. In this example embodiment, a biasing member 48, such as a coil spring coupled between the guide member 32 and the stem member 42, biases the stem member 42 to a default position, which can be referred to as a "rest position", relative the guide member 32, in the absence of an external force applied by the user against the bias. In the rest position, the tang catch 44 is retracted back into the working tip 38 of the guide member 32.

Figure 5B:
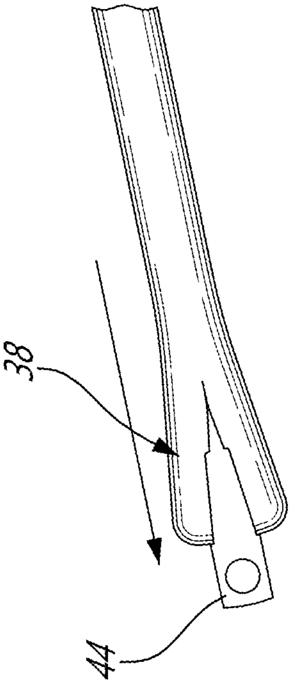
FIG. 5B is a view similar to FIG. 5A, with the tang catch in an extended position.
Figure 5A:
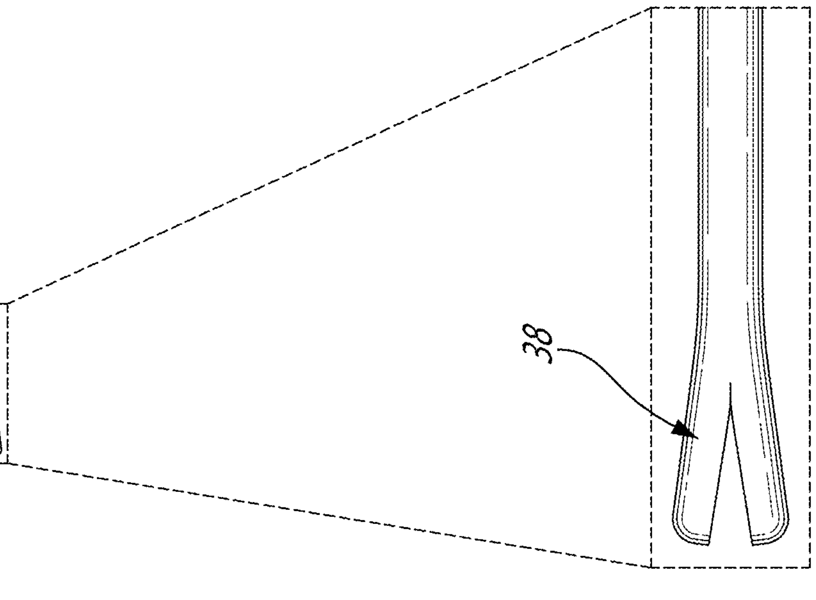
FIG. 5A is a view showing an enlarged portion of FIG. 4, with a tang catch in a rest position.
Figure 5C:
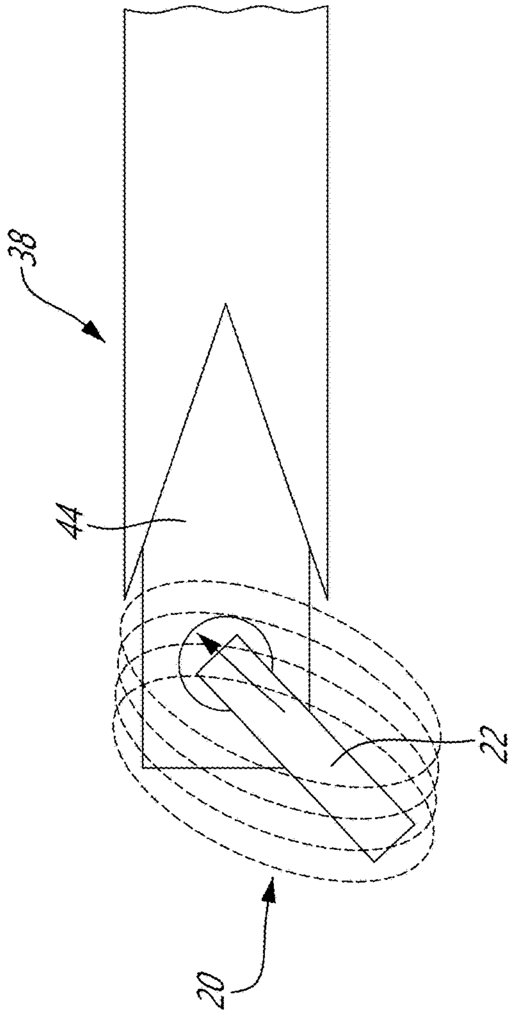
FIG. 5C is a view similar to FIG. 5B, schematizing engagement of the tang with the tang catch.

As shown in FIG. 5C, the user can apply the external force, against the bias, to push the tang catch 44 out from the working tip 38, in which configuration the tang catch 44 can be engaged with the tang 22. Once the external force is released, the tang catch 44 can be retracted towards the guide member 32 by the bias force exerted by the biasing member 48, which is no longer canceled by the external force, until the tang 22 becomes engaged with the working tip 38, in the catch position shown in solid lines in FIG. 5D.

Figure 5D:
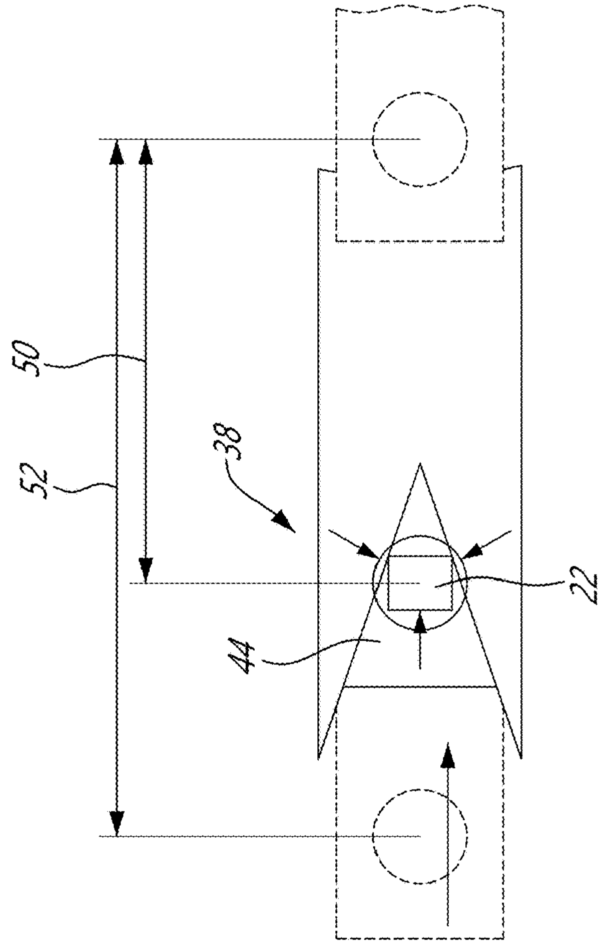
FIG. 5D is a view similar to FIG. 5C, showing the tang catch in the catch position.

Indeed, the tang 22 can have a length which is transversally-oriented relative the length of the stem member 42 and guide member 32, and which is greater than a transversal width or thickness of the working end 38, and can act as a stop to the retracting movement of the tang catch 44, preventing the tang catch 44 to retract fully to the rest position (shown in dashed lines on the right hand side of FIG. 5D). Accordingly, a bias force may continuously be applied in the absence of an external force when the tang catch 44 is in the catch position shown in solid lines in FIG. 5D. In an embodiment where the biasing member 48 is a coil spring which can exert a biasing force F which can be modeled as the relationship $F=kd$, where k is the spring constant and d is the displacement, the biasing force in the catch position, $F_{catch}$, can correspond to $F_{catch}=kd_{catch}$, with $d_{catch}$ corresponding to the distance 50 between the catch position and the rest position as illustrated in FIG. 5D. Moreover, the biasing force in the extended position $F_{ext}$ (shown in dashed lines on the left hand side of FIG. 5D) can correspond to $F_{ext}=kd_{ext}$, where $d_{ext}$ corresponding to the distance 52 between the extended position and the rest position as illustrated in FIG. 5D, and $F_{ext}$ can thus be greater than $F_{catch}$.

The user may proceed to bend the tang 22 back and forth, break the tang off from the main helical body 28 of the helical coil 20, and retract the working tip 38, with the tang 22, from the aperture 24, while the biasing force is continuously applied by the biasing member 48, holding the tang 22 trapped against the working tip 38. And then, when the tang 22 is safely out from engagement with the aperture 24, the user may apply the external force to release the tang 22 from the engagement with the working tip, and remove the tang 22 from the tang catch 44 without risking loss of the tang 22 in the aperture 24.

In the embodiment presented in FIGS. 5A to 5D, tang catch 44 is provided in the form of an aperture defined transversally through a tip portion of stem member 42, which can be narrower than the spacing s shown in FIG. 2. In an alternate embodiment, the tang catch 44 may be shaped as a hook, with a free end, instead of being formed as a closed loop around an aperture, but it was found that at least in some embodiments, the closed loop configuration could provide greater ruggedness.

In the embodiment presented in FIGS. 5A to 5D, the working tip 38 of the guide member 32 has a V-shaped notch which was found to provide a wedge, offering better hold of the tang 22 than a square-cut end, but in some embodiments, providing the working tip 38 with a simple shape, such as a squarely cut end, may be suitable as well.

In the embodiment presented in FIGS. 5A to 5D, the guide member 32 has a tubular sleeve acting as a main shaft with a hollow forming a guiding conduit for the stem member 42, which was found to form a suitable longitudinal guiding surface for the elongated stem portion, or rod, of the stem member 42, but it will be understood that in some embodiments, the guide member 32 may be apertured or otherwise discontinuous.

In the embodiment presented in FIGS. 5A to 5D, the holder 40 is provided in the form of a disc extending transversally relative a length of the guide member 32, the length extending between the first end 34 and the second end 36, but it will be understood that other forms and configurations of holders are possible in alternate embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications than the ones discussed above could be implemented by a person of ordinary skill in the art in view of the present disclosure, which modifications would be within the scope of the present technology.

The invention claimed is:

1. A method of installing a helical insert in an aperture communicating with a gas path of a gas turbine engine, the helical insert having a tang, the method comprising:

sliding a stem member of a tool relative a guide member of the tool, thereby exposing a tang catch of the stem member, including applying an external force against a bias force;

moving the tang catch across a cylindrical cavity of the helical insert, towards the tang;

while the tang catch is exposed, engaging the tang catch with the tang;

while the tang is engaged with the tang catch, releasing the external force, the bias force thereby retracting the stem member in the guide member and engaging the tang against a working tip of the guide member; and rotating the helical insert in the aperture, thereby threadingly engaging a body of the helical insert with the aperture, including rotating the tool around a length of the tool, while the tang is engaged against the working tip by the bias force.

2. The method of claim 1, further comprising, while the body of the helical insert is threadingly engaged with the aperture, and the tang is engaged against the working tip, bending the tang back and forth relative the body of the helical insert using the tool, breaking the tang off from the body of the helical insert, and removing the tang from the aperture using the tool.

3. The method of claim 1 wherein said sliding the stem member relative the guide member includes pushing the stem member with a thumb, against the bias force, while holding the guide member with fingers.

4. The method of claim 1 wherein said engaging the tang against the working tip includes wedging the tang into a V-shaped notch formed in the working tip.

5. A method of removing a tang of a helical insert installed in an aperture with a tool, the method comprising: using the tool, while the tang is engaged with a tang catch of a stem member of the tool, and pushed against a working tip of a guide member of the tool by the tang catch by a bias force exerted passively by a biasing member between the guide member and the stem member, i) bending the tang back and forth relative the body of the helical insert, ii) breaking the tang off from a body of the helical insert, and iii) removing the tang from the aperture; further comprising, prior to said bending, breaking and removing:

sliding the stem member relative the guide member of the tool, thereby exposing a tang catch of the stem member, including applying an external force against the bias force;

moving the tang catch across a cylindrical cavity of the helical insert, towards the tang;

while the tang catch is exposed, engaging the tang catch with the tang; and while the tang is engaged with the tang catch, releasing the external force, the bias force thereby retracting the stem member in the guide member and engaging the tang against the working tip of the guide member.

6. The method of claim 5 wherein when the tang is engaged with the tang catch, the tang is wedged in a V-shaped notch formed in the working tip.

* * * * *